United States Patent
Farmer et al.

(10) Patent No.: US 6,657,775 B1
(45) Date of Patent: Dec. 2, 2003

(54) SYSTEM AND METHOD FOR PROVIDING A CONTROLLED LINEWIDTH EXTERNAL CAVITY LASER

(75) Inventors: Jason N. Farmer, Seattle, WA (US); Mark R. Pratt, Seattle, WA (US); Richard D. Romea, Seattle, WA (US)

(73) Assignee: Nlight Photonics Corporation, Seattle, WA (US)

( * ) Notice: Subject to any disclaimer, the term of this patent is extended or adjusted under 35 U.S.C. 154(b) by 0 days.

(21) Appl. No.: 09/945,324

(22) Filed: Aug. 31, 2001

(51) Int. Cl.[7] .............................. H01S 3/00; H01S 3/10
(52) U.S. Cl. ...................... 359/334; 359/341.3; 372/20
(58) Field of Search .............................. 359/334, 341.3; 372/20

(56) References Cited

U.S. PATENT DOCUMENTS

| | | |
|---|---|---|
| 4,881,790 A | 11/1989 | Mollenauer |
| 4,923,270 A | 5/1990 | Carter |
| 5,115,444 A | 5/1992 | Kirkby et al. |
| 5,163,058 A | 11/1992 | Farries et al. |
| 5,319,668 A | 6/1994 | Luecke |
| 5,351,262 A | 9/1994 | Poguntke et al. |
| 5,379,310 A | 1/1995 | Papen et al. |
| 5,386,426 A | 1/1995 | Stephens |
| 5,510,920 A | 4/1996 | Ota |
| 5,528,612 A | 6/1996 | Scheps et al. |
| 5,563,732 A * | 10/1996 | Erdogan et al. ............ 359/341 |
| 5,570,226 A | 10/1996 | Ota |
| 5,773,345 A | 6/1998 | Ota |
| 6,052,394 A | 4/2000 | Lee et al. |
| 6,130,899 A | 10/2000 | Epworth et al. |
| 6,208,679 B1 * | 3/2001 | Sanchez-Rubio et al. ..... 372/92 |
| 6,384,963 B2 | 5/2002 | Ackerman et al. |
| 6,433,920 B1 * | 8/2002 | Welch et al. ............... 359/334 |
| 6,501,782 B1 | 12/2002 | Farmer |

FOREIGN PATENT DOCUMENTS

JP   62-229891   10/1987

OTHER PUBLICATIONS

Agarwal, Govind P. "Line Narrowing in a Single–Mode Injection Laser Due to External Optical Feedback." IEEE Journal of Quantum Electronics, vol. QE–20, No. 5 (May 1984). pp. 468–471.

Lenstra, Daan , Verbeek,Bastian H. and Boef, Arie J.Den. "Coherence Collapse in Single–Mode Semiconductor Lasers Due to Optical Feedback." IEEE Journal of Quantum Electronics, vol. QE–21, No. 6, (Jun. 1985) pp. 674–679.

* cited by examiner

*Primary Examiner*—Mark Hellner
(74) *Attorney, Agent, or Firm*—Fulbright & Jaworski L.L.P.

(57) ABSTRACT

The present invention is in general related to efficient operation of an external cavity laser and more particularly to a system and method of operating an external cavity laser utilizing one or more controlled linewidth gain elements. Specifically, the linewidth of an gain elements is broadened so that Brillouin scattering mechanisms in a gain medium are eliminated or reduced.

7 Claims, 1 Drawing Sheet

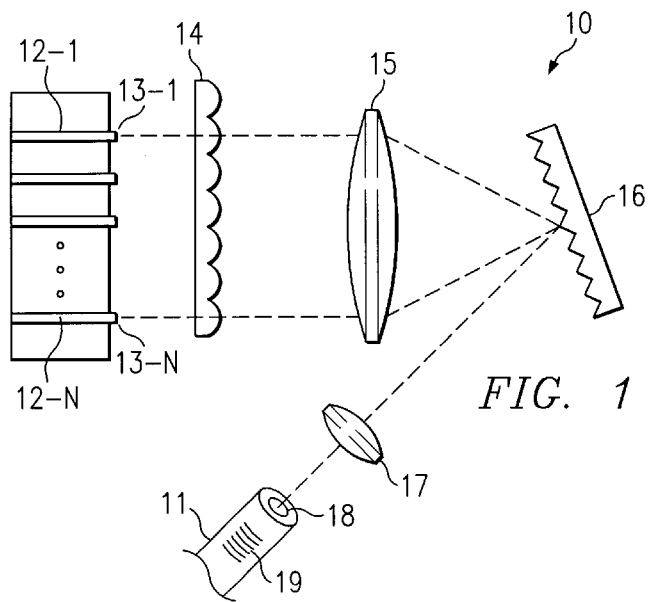
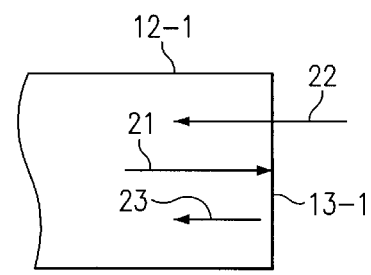
FIG. 1
FIG. 2
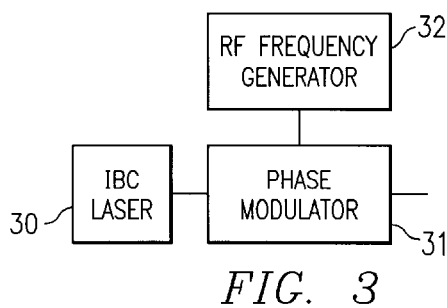
FIG. 3
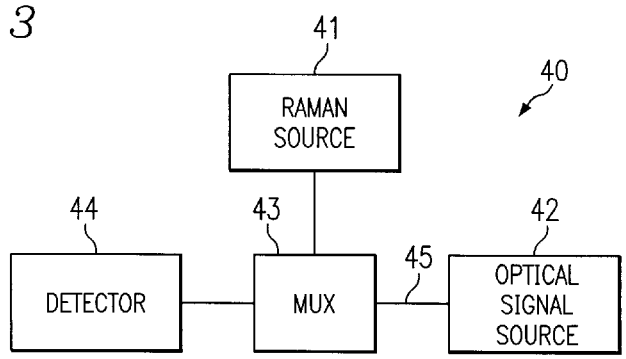
FIG. 4
(PRIOR ART)

SYSTEM AND METHOD FOR PROVIDING A CONTROLLED LINEWIDTH EXTERNAL CAVITY LASER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Raman amplifiers have been developed to amplify optical signals. A Raman amplifier relies upon the Raman scattering effect. The Raman scattering effect is a process in which light is frequency downshifted in a material. The frequency downshift results from a nonlinear interaction between light and the material. The difference in frequency between the input light and the frequency downshifted light is referred to as the Stokes shift which in silica fibers is of the order 13 THz.

When photons of two different wavelengths are present in an optical fiber, Raman scattering effect can be stimulated. This process is referred to as stimulated Raman scattering (SRS). In the SRS process, longer wavelength photons stimulate shorter wavelength photons to experience a Raman scattering event. The shorter wavelength photons are destroyed and longer wavelength photons, identical to the longer wavelength photons present initially, are created. The excess energy is conserved as an optical phonon (a lattice vibration). This process results in an increase in the number of longer wavelength photons and is referred to as Raman gain.

The probability that a Raman scattering event will occur is dependent on the intensity of the light as well as the wavelength separation between the two photons. The interaction between two optical waves due to SRS is governed by the following set of coupled equations:

$$\frac{dI_S}{dz} = g_R I_S I_P - \alpha_S I_S$$

$$\frac{dI_P}{dz} = -\frac{\lambda_S}{\lambda_P} g_R I_S I_P - \alpha_P I_P$$

where $I_s$ is the intensity of the signal light (longer wavelength), $I_p$ is the intensity of the pump light (shorter wavelength), $g_R$ is the Raman gain coefficient, $\lambda_s$ is the signal wavelength, $\lambda_p$ is the pump wavelength, and $\alpha_s$ and $\alpha_p$ are the fiber attenuation coefficients at the signal and pump wavelengths respectively. The Raman gain coefficient, $g_R$, is dependent on the wavelength difference $(\lambda_s-\lambda_p)$ as is well known in the art.

As is well understood in the art, SRS is useful for generating optical gain. Optical amplifiers based on Raman gain are viewed as promising technology for amplification of WDM and DWDM telecommunication signals transmitted on optical fibers. Until recently, Raman amplifiers have not attracted much commercial interest because significant optical gain requires approximately one watt of optical pump power. Lasers capable of producing these powers at the wavelengths appropriate for Raman amplifiers have only come into existence over the past few years. These advances have renewed interest in Raman amplifiers.

FIG. 4 depicts a prior art arrangement of optical system 40 which includes a Raman amplifier. Optical system 40 includes optical signal source which generates an optical signal to be detected by detector 44. For example, telecommunication providers utilize wavelengths within the C Band (1530 to 1565 nm) and L Band (1570 to 1610 nm) to provide channels to carry information optically. Additionally, it is anticipated telecommunication providers may also begin to utilize wavelengths in the S Band (1430 to 1530 nm) and the XL Band (1615 to 1660 nm). Accordingly, the optical signal may comprise one or more wavelengths within these bands. Detector 44 is disposed at some appreciable distance from optical signal source 42. Raman source 41 provides a Raman pump. Raman source 41 provides the Raman pump to multiplexer 43. Multiplexer 43 causes the Raman pump to enter optical fiber 45 which also carries the optical signal generated by optical signal source 42. Due to SRS, the optical signal experiences Raman gain at the desired wavelength(s) in fiber 45.

External cavity diode lasers (ECDL's) are most typically used to narrow the linewidth of the laser. In this context, linewidth refers to or measures the width of the spectral content of the output of a laser diode. By utilizing an external cavity, the linewidth of a laser can be reduced by many orders of magnitude. An example of an external cavity laser is provided in U.S. Pat. No. 5,319,668.

The reduction in linewidth of an ECDL can result in an accompanying process that is referred to as Brillouin scattering. Brillouin scattering is analogous to Raman scattering. The primary differences are that, in lieu of an optical phonon, an acoustic phonon is generated, the Stokes shift in silica fibers is 10 GHz instead of 13 THz, and the Brillouin gain coefficient is about 2 orders of magnitude larger. It will be appreciated that if a typical ECDL is used as a Raman pump source, Brillouin scattering will backscatter the pump light in competition with stimulated Raman scattering. Specifically, this backscattering prevents the pump light from propagating down the length of the fiber to stimulate the Raman process. Accordingly, typical ECDL's are not suitable for Raman amplifier pump source applications.

BRIEF SUMMARY OF THE INVENTION

The present invention is directed to a system and method for operating an external cavity laser to obtain a linewidth controlled output. In some embodiments, the system and method modify an incoherently beam combined (IBC) laser to achieve the desired linewidth control. In some embodiments, laser diodes of an IBC laser are modified to cause the laser diodes to operate in a coherence collapse regime (a non-linear region of laser operation defined by feedback effects) by selecting etalon surface reflectivity of the diodes relative to feedback received from the external cavity. By operating the diodes in the coherence collapse regime, the laser diodes are caused to have significantly broadened linewidth due to non-linear effects. In other embodiments, the linewidth of the laser diodes is broadened by utilizing a phase modulator. The relatively broad linewidth of embodiments of the present invention, in turn, can be used to adapt an external cavity device such as an IBC laser for use as a Raman pump.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 1 depicts an exemplary incoherently beam combined (IBC) laser according to embodiments of the present invention;

FIG. 2 depicts an exemplary emitter with feedback from an external cavity according to embodiments of the present invention; and FIG. 3 is a block diagram depicting an IBC laser coupled to a phase modulator according to embodiments of the present invention; and FIG. 4 is a block diagram of an exemplary optical system including a Ramen amplifier according to the prior art.

DETAILED DESCRIPTION OF THE INVENTION

Brillouin gain in a material is given by the following equation:

$$g_B(v_B) = \frac{2\pi n^2 p_{12}^2}{c \lambda_L^2 \rho_0 v_A \Delta v_B}$$

where n is the index of refraction, $p_{12}$ is the longitudinal elasto-optic coefficient, c is the speed of light, $\lambda_L$ is the wavelength of the laser light, $v_A$ is the frequency of the acoustic wave, and $\Delta v_B$ is the full width at half maximum of the Brillouin gain profile (which is typically of order 40 MHz).

It will be appreciated that linewidths, $\Delta v_L$, of typical ECDL's are of order from several hundred kHz to several MHz. When the linewidth of a laser is increased to a value above the Brillouin gain width, $\Delta v_B$, the Brillouin gain, $g_B$, is reduced to:

$$\tilde{g}_B = \frac{\Delta v_B}{\Delta v_B + \Delta v_L} g_B(v_B)$$

where $\tilde{g}_B$ is the new Brillouin gain and $\Delta v_L$ is the linewidth of an emitter of the ECDL.

The power threshold at which Brillouin scattering has a significant adverse impact is dependent on detailed material parameters of the optical fiber. Typically, the power threshold is of the order of a few milliwatts. To eliminate or reduce the impact of Brillouin scattering to suitable levels, it is advantageous to increase the linewidth of an ECDL above 100 MHz. By increasing the linewidth of an ECDL, the Brillouin gain will be relatively reduced as represented in the above equations. The associated backscattering will also be reduced. Accordingly, this allows an ECDL to be utilized as a Raman pump to generate Raman gain, because the output beam of the ECDL is thereby allowed to propagate through an optical medium (e.g., a silica fiber) to stimulate Raman scattering.

FIG. 1 depicts exemplary incoherently beam combined (IBC) laser 10 which is adapted according to embodiments of the present invention. Specifically, IBC laser 10 possesses a plurality of gain elements or emitters 12-1 through 12-N which are caused to operate in the coherence collapse regime. By operating in the coherence collapse regime, the linewidth of emitters 12-1 through 12-N are broadened to reduce or eliminate the negative effects of Brillouin scattering in an optical medium.

Although emitters 12-1 through 12-N can be implemented as discrete devices, emitters 12-1 through 12-N are advantageously implemented on an integrated device through a variety of techniques including photo-lithographic techniques. Emitters 12-1 through 12-N may comprise any number of semiconductor materials such as GaAlAs, GaAs, InGaAs, InGaAsP, AlGaInAs, and/or the like, which are capable of lasing at particular wavelengths. It shall be appreciated that embodiments of the present invention are not limited to any particular implementation of emitters 12-1 through 12-N. Any number of designs may be utilized including, but not limited to, edge emitters, vertical cavity surface emitting lasers (VCSELs), and grating surface emitting lasers. Accordingly, the term "emitter" is intended to mean any gain material or element capable of lasing in response to feedback.

Emitters 12-1 through 12-N respectively include output facets 13-1 through 13-N. Output facets 13-1 through 13-N provide a partially reflective surface at the emitting surface of emitters 12-1 through 12-N. Output facets 13-1 through 13-N can be implemented utilizing dielectric material or films. Additionally, a substantially fully reflective surface (not shown) is placed on the opposite side of emitters 12-1 through 12-N.

The external cavity of IBC laser 10 includes micro-optic 14, collimating optic 15, diffraction grating 16, and optical fiber 11. The light emitted from emitters 12-1 through 12-N is partially collimated by micro-optic 14 which may be implemented as an array of micro-lenses utilizing photo-lithographic techniques or as a cylindrical lens. The partially collimated light is then further collimated by collimating optic 15 (e.g., a lens) such that the chief rays of the beams from individual emitters 12-1 through 12-N intersect or spatially overlap on diffraction grating 16. The beams are then diffracted on the first order through fiber coupling lens 17, thereby multiplexing the beams. Fiber coupling lens 17 couples the multiplexed beams into optical fiber 11 via fiber facet 18. Intra-fiber partial reflector 19 provides feedback to emitters 12-1 through 12-N, thereby controlling their emission wavelengths.

It will be appreciated that the geometry of the external cavity of IBC laser 10 defines the resonant wavelengths of emitters 12-1 through 12-N. The center wavelength ($\lambda_i$) of the wavelengths fed back to the $i^{th}$ emitter 12-i is given by the equation: $\lambda_i = A[\sin(\alpha_i) + \sin(\beta)]$, where A is the spacing between adjacent rulings on diffraction grating 16, $\alpha_i$ is the angle of incidence of the light from the $i^{th}$ emitter on diffraction grating 16, and β is the output angle which is common to all emitters 12-1 through 12-N. Since the feedback to each emitter 12-i varies according to its position on the array, a relatively broad spectrum of output light can be generated by IBC laser 10. Additionally, the ability to combine the output incoherently from a number of emitters 12-1 through 12-N allows IBC laser 10 to achieve a relatively high output power.

Although IBC laser 10 utilizes diffraction grating 16 to provide feedback to emitters 12-1 through 12-N and to multiplex their output beams, other feedback and multiplexing elements may be substituted. For example, transmission diffraction gratings, prisms, holograms, and other multiplexing elements including arrayed waveguide gratings (AWGs) and Mach-Zehnder interferometers may be utilized in lieu of reflective diffraction grating 16. The particular dispersive element used in a given application will influence the geometry of the external cavity.

To illustrate how emitters 12-1 through 12-N can be operated in the coherence collapse regime, reference is now made to FIG. 2. FIG. 2 depicts exemplary emitter 12-1 in greater detail. Emitter 12-1 is shown to be generating light beam 21 via lasing. Light beam 21 propagates forward and, therefore, a portion of light beam 21 is reflected by facet 13-1. Facet 13-1 causes a portion of the power associated with light beam 21 to be reflected backward as light beam 23. The ratio of the power associated with light beam 21 and the power associated with light beam 23 defines the reflectivity of facet 13-1. The portion of light beam 21 that is not reflected exits emitter 12-1 and traverses the external cavity of IBC laser 10 as described above in connection with FIG. 1. In particular, it is pertinent to note that a portion of the non-reflected light is reflected by intra-fiber reflector 19 and returns to emitter 12-1 as feedback light beam 22. The ratio of the power associated with light beam 23 and the power associated with light beam 22 shall be referred to as the feedback ratio.

According to embodiments of the present invention, the feedback ratio is selectively designed such that emitters 12-1 through 12-N possess a linewidth that is significantly above the width of the Brillouin gain profile ($\Delta v_B$). Advantageously, the feedback ratio is designed to be within the range of -5 to -40 dB, such that emitters 12-1 through 12-N will operate in a largely non-linear manner. Due to the non-linear operation, the linewidth of emitters 12-1 through 12-N is relatively increased, consequently avoiding appreciable stimulation of Brillouin scattering.

It will be appreciated that the feedback ratio is largely controlled by the reflectivity of facets 13-1 through 13-N and of intra-fiber reflector 19. Some loss occurs within the cavity of IBC laser 10. For example, a certain amount of loss occurs due to coupling to the fiber and due to diffraction efficiency of diffraction grating 16. Of course, such loss associated with intra-cavity effects should be considered. However, these effects may be primarily addressed by compensating for such loss through the selection of the reflectivities of facets 13-1 through 13-N and of intra-fiber reflector 19 to achieve the desired feedback ratio.

FIG. 3 is a block diagram depicting another embodiment of the present invention in which IBC laser 30 is coupled to optical phase modulator 31. IBC laser 30 can be implemented in the same manner as IBC laser 10. However, IBC laser 30 does not necessarily operate its emitters 12 in the coherence collapse regime, since linewidth broadening is provided by optical phase modulator 31. In this embodiment, optical phase modulator 31 is placed outside of the external cavity of IBC laser 30. Accordingly, optical phase modulator 31 receives the output beam from IBC laser 30 via optical fiber 11.

Optical phase modulator 31 is a device that is well known in the art and is commercially available. Optical phase modulator 31 allows an optical signal to be phase modulated in response to a control signal. A number of physical mechanisms can be utilized to implement optical phase modulator 31. For example, an electro-optical approach may be utilized. In an electro-optical phase modulator, a changing electrical signal (also known as a modulating or control signal) is applied between a pair of electrodes mounted on opposite faces of a crystal to create electric field stresses within the crystal. The output of IBC laser 30 propagates through the crystal in a direction perpendicular to the electric field between the electrodes, such that the intermittent interaction between the modulating electric field and the optical field modulates the optical light beam.

To produce linewidth broadening, RF frequency generator 32 can be coupled to optical phase modulator 31 to provide the modulating signal. RF frequency generator 32 provides a modulating signal at a frequency significantly above the width of the Brillouin gain profile ($\Delta v_B$). In some embodiments, RF frequency generator 32 provides a modulating signal that possesses a frequency that is significantly greater than 40 MHz. By providing the RF frequency signal to optical phase modulator 31, the linewidth of IBC laser 30 may be sufficiently broadened to eliminate or reduce Brillouin scattering in a gain medium.

Both of the techniques described above with respect to FIGS. 1, 2, and 3 are operable to increase the linewidth of ECDL's. By increasing the linewidth of ECDL's, the ECDL's are suitable for Raman pump applications. For example, the configurations depicted in FIGS. 1 and 3 are suitable to replace Raman source 41 of optical system 40 depicted in FIG. 4. By possessing broadened linewidth, the output beams of ECDL's will not experience appreciable Brillouin backscattering in the gain medium. Thus, the output beams will be allowed to generate the desired Raman gain.

In other embodiments, IBC laser 10 and IBC laser 30 can be utilized as the excitation source for another laser or laser amplifier. IBC laser 10 and IBC laser 30 can provide their output beam to excite a gain medium that is doped with appropriate materials. For example, IBC laser 10 and IBC laser 30 can excite an optical fiber doped with any of the following materials: Ce, Pr, Nd, Er, Tm, Ho, and Yb. In addition, multiple doping materials can be utilized. In particular, it is advantageous to dope a gain medium with both Yb and Er. It shall be appreciated that the use of IBC laser 10 and IBC laser 30 as the excitation source is advantageous for these types of applications. Specifically, IBC laser 10 and IBC laser 30 are capable of providing a relatively high output power to excite the particular gain medium, because IBC laser 10 and IBC laser 30 are operable to combine the output beams from a plurality of emitters.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed as new and desired to be protected by Letters Patent of the United States is:

1. A Raman amplifier, comprising:

an array of gain elements being operable to provide a plurality of output beams;

a collimator being operable to cause said plurality of output beams to spatially overlap on a dispersive element and being operable to cause feedback received from said dispersive element to be directed to said array of gain elements;

said dispersive element being operable to direct said output beams to a partially reflective component and being operable to cause feedback received from said partially reflective component to be directed to said collimator;

said partially reflective component being operable to allow transmission of a portion of power of said output beams from said dispersive element and being operable to reflect a portion of power of said output beams to said dispersive element as feedback; and an optical fiber being operable to receive an output optical signal comprising power from at least said portion of power transmitted by said partially reflective component to generate optical gain in said optical fiber wherein said output optical signal possesses sufficient linewidth to avoid stimulating appreciable Brillouin scattering in said optical fiber.

2. The Raman amplifier of claim 1 wherein each gain element of said array of gain elements operates in a coherence collapse regime.

3. The Raman amplifier of claim 1 wherein each of said gain elements comprises a facet to cause a first portion of power to be reflected internally, wherein each of said gain elements receives a second portion of power as feedback, and wherein the ratio of said first portion to said second portion is with the range of −5 to −40 dB.

4. The Raman amplifier of claim 1 further comprising:

a phase modulator being operable to receive said portion of power transmitted by said partially reflective component and being operable to phase modulate said portion of power so as to spread said power over a broader amount of spectrum.

5. A Raman amplifier comprising:

at least one laser diode for producing output light, said at least one laser diode possessing a partially reflective facet causing a first amount of power to be reflected internally within said at least one laser diode;

a partially reflective component in an external cavity, said partially reflective component being operable to allow transmission of a first portion of said output light and to reflect a second portion of said output light as feedback for said at least one laser diode, wherein said at least one laser diode receives a second amount of power associated with said feedback, and wherein the ratio of the first amount to the second amount is within the range of −5 to −40 dB; and an optical fiber for receiving the first portion of said output light to generate optical gain.

6. The Raman amplifier of claim 5 wherein said partially reflective component is embedded in said optical fiber.

7. The Raman amplifier of claim 5 wherein said at least one laser diode is one of an array of laser diodes and wherein said external cavity further comprises:

a collimator;

a dispersive element; and said collimator and dispersive element being operable to incoherently combine output light from said array of laser diodes.

* * * * *